(12) United States Patent
Doherty et al.

(10) Patent No.: US 8,498,676 B2
(45) Date of Patent: Jul. 30, 2013

(54) TERMINATED CALL ALERT PROCESS AND SYSTEM

(75) Inventors: James Doherty, Wyandotte, MI (US); Michael J. Blanck, Clarkston, MI (US)

(73) Assignee: General Motors LLC, Detroit, MI (US)

( * ) Notice: Subject to any disclaimer, the term of this patent is extended or adjusted under 35 U.S.C. 154(b) by 40 days.

(21) Appl. No.: 13/184,462

(22) Filed: Jul. 15, 2011

(65) Prior Publication Data

US 2013/0017847 A1    Jan. 17, 2013

(51) Int. Cl.
*H04M 1/00* (2006.01)
(52) U.S. Cl.
USPC ........ 455/567; 455/414.1; 455/418; 455/466; 455/556.1; 455/569.1; 455/569.2; 455/575.9; 370/310.2; 701/33.1; 379/67.1
(58) Field of Classification Search
USPC .............. 455/414.1, 418–420, 556.1, 569.1, 455/569.2, 575.9, 466, 567; 370/310.2; 701/33, 701/33.1; 379/67.1
See application file for complete search history.

(56) References Cited

U.S. PATENT DOCUMENTS

| | | | |
|---|---|---|---|
| 5,692,033 A * | 11/1997 | Farris | 379/67.1 |
| 6,343,216 B1 * | 1/2002 | Kim et al. | 455/450 |
| 6,975,720 B1 | 12/2005 | Crook | |
| 7,856,297 B2 | 12/2010 | Ampunan et al. | |
| 2005/0107072 A1 * | 5/2005 | True et al. | 455/414.1 |
| 2009/0275343 A1 * | 11/2009 | Monnes et al. | 455/453 |
| 2011/0208386 A1 * | 8/2011 | Jiang et al. | 701/33 |

* cited by examiner

*Primary Examiner* — Steve D Agosta
(74) *Attorney, Agent, or Firm* — Dierker & Associates, P.C.

(57) ABSTRACT

A terminated call alert process involves detecting, via a processor, that a voice connection initially established between a vehicle-dedicated communications device disposed inside a vehicle and a facility has been terminated and identifying a method used to terminate the initial voice connection. Via the vehicle-dedicated communications device, the method further involves transmitting a data message to the facility, where the data message includes information pertaining to the method used to terminate the initial voice connection. Also disclosed herein is a system for accomplishing the same.

8 Claims, 3 Drawing Sheets

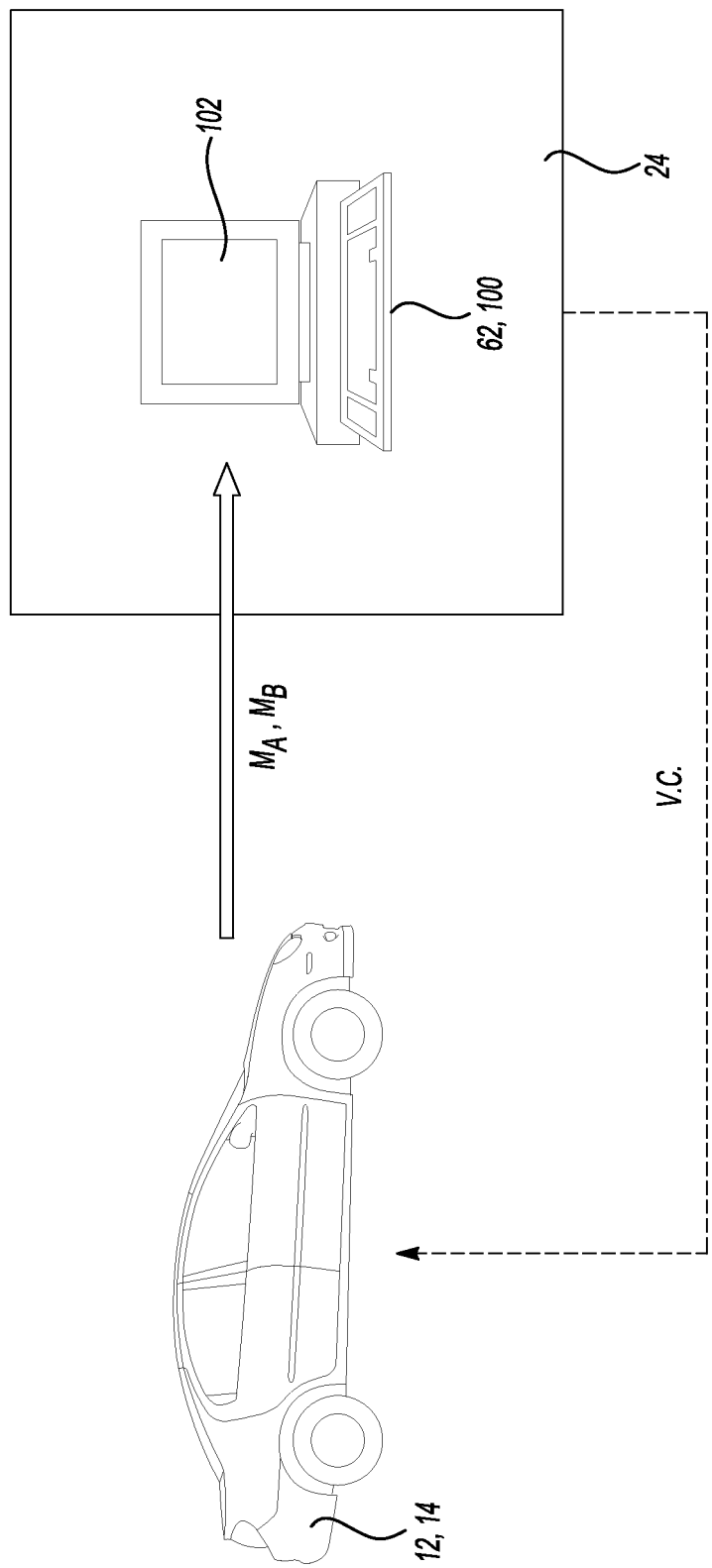

US 8,498,676 B2

TERMINATED CALL ALERT PROCESS AND SYSTEM

TECHNICAL FIELD

The present disclosure relates generally to terminated call alert processes and systems.

BACKGROUND

Call centers employ one or more advisors to service voice calls received from a number of subscribers. The advisor(s) may also initiate his/her/their own voice calls to particular subscribers such as, for example, to offer new services, to address concerns and/or issues related to the subscriber accounts, and/or the like. The voice call may be terminated once the purpose for which the advisor-initiated or the subscriber-initiated call has been addressed, and no further servicing is required.

SUMMARY

A terminated call alert process is disclosed herein. The process involves detecting that a voice connection initially established between a vehicle-dedicated communications device disposed inside a vehicle and a facility has been terminated. The detecting is accomplished using a processor operatively associated with the vehicle-dedicated communications device, and the processor executes computer program code encoded on a computer readable medium. Via the processor, the process further involves identifying a method used to terminate the initial voice connection. Via the vehicle-dedicated communications device, a data message is transmitted to the facility, where the data message includes information pertaining to the method used to terminate the initial voice connection.

Also disclosed herein is a system for accomplishing the same.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 4 schematically illustrates an example of a method for transmitting a data message to a facility upon detecting that a voice connection was terminated.

DETAILED DESCRIPTION

Figure 1:
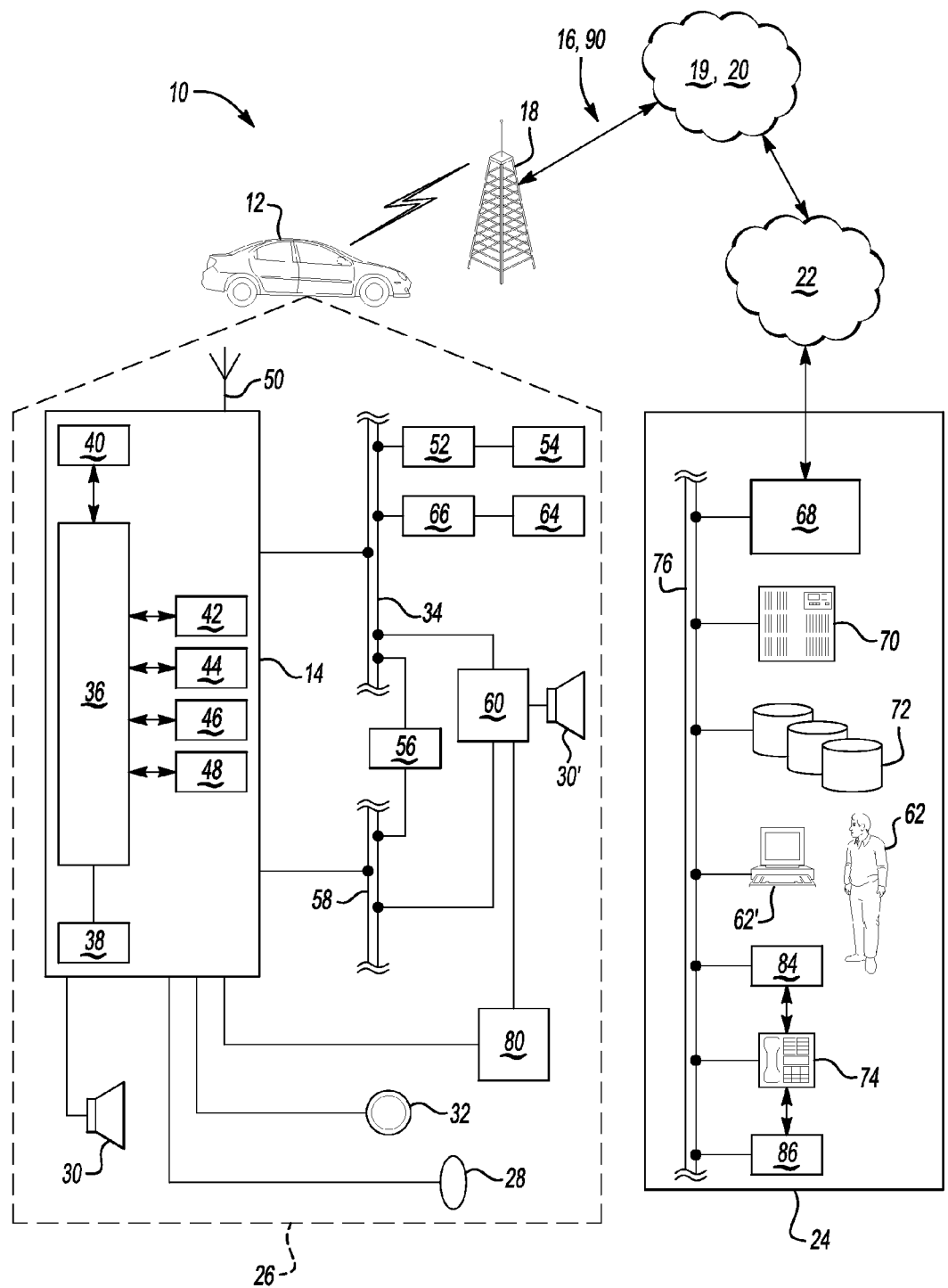
FIG. 1 is a schematic diagram depicting an example of a terminated call alert system.

Every now and then, a call center advisor may experience an unexpected termination of a voice connection with a subscriber before the voice connection has been fully serviced. Sometimes, the unexpected termination is due to a dropped connection because of a failure of the communications system or network used to establish the voice connection. Other reasons for an unexpected termination may include an issue pertaining to the subscriber's device (e.g., a software error) and/or an issue pertaining to the call center (e.g., a loss of power at the call center). In yet other cases, an unexpected termination may have been intentional, such as when the subscriber has activated a disconnect function associated with his/her calling device.

In some instances, the advisor who was party to the lost voice connection may elect to initiate a call back to the subscriber in response to the terminated voice connection. However, in some cases, the subscriber may have indicated (either explicitly or implicitly) to the advisor during the initial voice connection, or the advisor has some other reason to believe that the subscriber no longer wants to speak with the advisor. In these cases, a call back to the subscriber may, to some extent, be undesirable and may, in some cases, affect customer service quality of the call or service center.

Example(s) of the process and system as disclosed herein may be used to inform a call center advisor of the method that was used to terminate a voice connection with a subscriber. The advisor may use the information to determine whether or not the advisor should initiate a call back to the subscriber. The process and system utilizes a processor operatively associated with the subscriber's calling device, and this processor executes a computer program to identify the method that was used to terminate the initial voice connection with the call center advisor. Upon identifying the method, the processor, via the computer program, generates a data message including information pertaining to the identified method, and this data message may be transmitted from the subscriber's calling device to the call center advisor. In some examples, the data message may be formatted and displayed on a display screen of the advisor's workstation. The advisor utilizes the information contained in the data message to render a decision as to whether or not a call back to the subscriber should be initiated.

It is believed that the process and system disclosed herein reduces the number of unwanted call backs to subscribers, which may advantageously save airtime as well as the advisor's work time. It is further believed that the customer service quality of the call center may be improved, at least in part because subscribers may not be overwhelmed with unwanted return calls that may otherwise occur when advisors are unaware of the reason(s) why the initial call was terminated. The method and system may also be used, for example, by call center management personnel as a tool for monitoring advisor performance. For instance, the tool may be used to track how a call is terminated, such as from the call center's side or the subscriber's side. The tracking may be used to accrue some statistics that may be used to rate how well advisors handle/service subscriber calls.

An example of a terminated call alert system 10 is schematically shown in FIG. 1. In this example, the subscriber is a person that owns or otherwise is in possession of a vehicle 12 that includes a vehicle-dedicated communications device (i.e., a telematics unit 14). The telematics unit 14 may be used by the subscriber to initiate voice calls to a telematics service or call center 24 (e.g., to request a telematics service such as a vehicle-door-unlock service, navigation instructions, etc.). The telematics unit 14 may also receive incoming voice calls from, e.g., the call center 24, such as to offer new telematics services to the subscriber, to address issues pertaining to the subscriber's account, etc. It is to be understood that the telematics unit 14 may also be used to initiate and/or receive calls to/from other devices that are not necessarily associated with the call center 24. In this respect, the telematics unit 14 operates as simply a mobile calling device, similar to a cellular phone.

It is further to be understood that the terminated call alert process may also be used for other systems, such as those that include facilities other than a telematics service or call center. Examples of other facilities may include purchasing centers, public assistance centers, information centers, etc. Additionally, the process may be used for calling devices other than a telematics unit, such as other mobile communications devices (e.g., cellular phones, smart phones, etc.) or stationary communications devices (e.g., a landline phone). It is submitted that one skilled in the art would know how to modify the teachings of the instant disclosure in order to adapt the process for use with these other systems/devices.

As used herein, the term "user" refers to a vehicle owner, a vehicle driver, and/or a vehicle passenger, and the term "user" may be used interchangeably with the terms subscriber and/or service subscriber.

Further, the term "caller" may be used to describe a person or other entity initiating a call (such as a voice call). The caller may be the vehicle user initiating a voice call to a call center (e.g., the call center 24 in FIG. 1) utilizing, for example, a telematics unit (e.g., the telematics unit 14 in FIG. 1). The caller may otherwise be an advisor at the call center 24 initiating a voice call to the subscriber using a call center telephony system or other communications module 86 associated with the call center 24. The telematics unit 14 and the call center communications module 86 will be described in further detail below.

Additionally, a "call back" is a term that is used herein to describe a voice call initiated by an advisor 62, 62' at the call center 24 and directed to the subscriber vehicle 12, and this call is made in response to a terminated initial voice connection between the call center 24 and the subscriber vehicle 12. It is to be understood that the term "call back" may be used interchangeably with the term "return call".

Furthermore, the term "communication" itself is to be construed to include all forms of communication, including direct and indirect communication. As such, indirect communication may include communication between two components with additional component(s) located therebetween.

Still further, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

As shown in FIG. 1, the terminated call alert system 10 generally includes a vehicle 12 (e.g., a subscriber vehicle), a telematics unit 14 operatively disposed in the mobile vehicle 12, a carrier/communication system 16 (including, but not limited to, one or more cell towers 18, one or more base stations 19 and/or mobile switching centers (MSCs) 20, and one or more service providers 90 including mobile network operator(s)), one or more land networks 22, and one or more telematics service/call centers 24. In an example, the carrier/communication system 16 is a two-way radio frequency communication system, and may be configured with a web service supporting system-to-system communications (e.g., communications between the call center 24 and the service provider 90).

The overall architecture, setup and operation, as well as many of the individual components of the system 10 shown in FIG. 1 are generally known in the art. Thus, the following paragraphs provide a brief overview of one example of the system 10. It is to be understood, however, that additional components and/or other systems not shown here could employ the method(s) disclosed herein.

Vehicle 12 is a mobile vehicle, such as a motorcycle, car, truck, recreational vehicle (RV), boat, plane, etc., and is equipped with suitable hardware and software that enables it to communicate (e.g., transmit and/or receive voice and data communications) over the carrier/communication system 16.

Some of the vehicle hardware 26 is shown generally in FIG. 1, including the telematics unit 14 and other components that are operatively connected to the telematics unit 14. Examples of other hardware 26 components include a microphone 28, a speaker 30 and buttons, knobs, switches, keyboards, and/or controls 32. Generally, these hardware 26 components enable a user to communicate with the telematics unit 14 and any other system 10 components in communication with the telematics unit 14. It is to be understood that the vehicle 12 may also include additional components suitable for use in, or in connection with, the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections, such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 provides a variety of services, both individually and through its communication with the call center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), and/or a dual antenna 50. In one example, the wireless modem 42 includes a computer program and/or set of software routines executing within processing device 36.

It is to be understood that the telematics unit 14 may be implemented without one or more of the above listed components (e.g., the short range wireless communication network 48). It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor. The electronic processing device 36 (also referred to herein as a processor) may, for example, include software programs having computer readable code encoded on a computer readable medium to initiate and/or perform various functions of the telematics unit 14. For instance, the processor 36 may include computer readable code for detecting that an initial voice connection established between the telematics unit 14 and a facility (such as, e.g., the call center 24) has been terminated, and for identifying the method used to terminate the voice connection. The processor 36 organizes the information into a data message (in the form, e.g., of a short message service (SMS) message, a packet data message, or a message containing computer readable code), and commands the telematics unit 14 to transmit the data message to the call center 24. In an example, transmission of the data message to the call center 24 may be accomplished utilizing the carrier/communications system 16. The data message may be utilized, e.g., by an advisor 62, 62' at the call center 24, to render a decision as to whether or not to initiate a call back to the telematics unit 14 in response to the terminated voice connection. Further details of the terminated call alert process will be described below in conjunction with FIGS. 2 through 4.

The location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone. Basically, the cellular chipset 40 is a semiconductor engine that enables the telematics unit 14 to connect with other devices using some suitable type of wireless technology. The cellular chipset/component 40 uses one or more prescribed frequencies in the 800 MHz analog band or in the 800 MHz, 900 MHz, 1900 MHz and higher digital cellular bands. In some cases, the cellular chipset/component 40 may also use a frequency below 800 MHz, such as 700 MHz or lower. In yet other cases, the cellular chipset/component 40 may use a frequency above 2600 MHz. Any suitable protocol may be used, including digital transmission technologies, such as TDMA (time division multiple access), CDMA (code division multiple access), GSM (global system for mobile telecommunications), and LTE (long term evolution). In some instances, the protocol may be short-range wireless communication technologies, such as BLUETOOTH®, dedicated short-range communications (DSRC), or Wi-Fi.

Also associated with electronic processing device 36 is the previously mentioned real time clock (RTC) 46, which provides accurate date and time information to the telematics unit 14 hardware and software components that may require and/or request date and time information. In an example, the RTC 46 may provide date and time information periodically, such as, for example, every ten milliseconds.

The electronic memory 38 of the telematics unit 14 may be configured to store data associated with the various systems of the vehicle 12, vehicle operations, vehicle user preferences and/or personal information, and the like.

In an example, the electronic processing device 36 further includes a Feature ID (FID) software program, which can detect network-dropped voice calls when the program is enabled.

The telematics unit 14 provides numerous services alone or in conjunction with the call center 24, some of which may not be listed herein, and is configured to fulfill one or more user or subscriber requests. Several examples of these services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering. It is to be understood that when these services are obtained from the call center 24 (or from a data server that is remotely located from the call center 24), the telematics unit 14 is considered to be operating in a telematics service mode.

Vehicle communications generally utilize radio transmissions to establish a voice channel with carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

The microphone 28 provides the user with a means for inputting verbal or other auditory commands, and can be equipped with an embedded voice processing unit utilizing human/machine interface (HMI) technology known in the art. Conversely, speaker(s) 30, 30' provides verbal output to the vehicle occupants and can be either a stand-alone speaker 30 specifically dedicated for use with the telematics unit 14 or can be part of a vehicle audio component 60, such as speaker 30'. In either event and as previously mentioned, microphone 28 and speaker(s) 30, 30' enable vehicle hardware 26 and telematics service call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication (i.e., a voice call) with the telematics service provider call center 24 (whether it be a live advisor 62 or an automated call response system 62') to request services. One or more of the other buttons 32 may also be an electronic pushbutton that may be used to activate a connect function upon receiving a voice call (e.g., from the telematics call center 24) and/or an electronic pushbutton that may be used to activate a disconnect function to terminate a voice call (e.g., with the telematics call center 24).

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system (e.g., speaker 30'), or may utilize speaker 30 via arbitration on vehicle bus 34 and/or audio bus 58.

Still referring to FIG. 1, the vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, environmental detection sensors, and/or the like. One or more of the sensors 64 enumerated above may be used to obtain vehicle data for use by the telematics unit 14 or the call center 24 (when transmitted thereto from the telematics unit 14) to determine the operation of the vehicle 12. Examples of sensor interface modules 66 include powertrain control, climate control, body control, and/or the like.

In an example, the vehicle hardware 26 includes a display 80, which may be operatively directly connected to or in communication with the telematics unit 14, or may be part of the audio component 60. Examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like. In an example, the display 80 may take the form of a touch screen, where various functions of the telematics unit 14 may be activated by a vehicle occupant, e.g., by applying pressure (e.g., via the vehicle occupant's finger) to a selected portion of the touch screen. These functions may include, for instance, voice call connect and disconnect functions of the telematics unit 14.

A portion of the carrier/communication system 16 may be a cellular telephone system or any other suitable wireless system that transmits signals between the vehicle hardware 26 and land network 22. According to an example, the wireless portion of the carrier/communication system 16 includes one or more cell towers 18, base stations 19 and/or mobile switching centers (MSCs) 20, as well as any other networking components required to connect the wireless portion of the system 16 with land network 22. It is to be understood that various cell tower/base station/MSC arrangements are possible and could be used with the wireless portion of the system 16. For example, a base station 19 and a cell tower 18 may be co-located at the same site or they could be remotely located, or a single base station 19 may be coupled to various cell towers 18, or various base stations 19 could be coupled with a single MSC 20. A speech codec or vocoder may also be incorporated in one or more of the base stations 19, but depending on the particular architecture of the wireless network 16, it could be incorporated within an MSC 20 or some other network components as well.

Land network 22 may be a conventional land-based telecommunications network that is connected to one or more landline telephones and connects the wireless portion of the carrier/communication network 16 to the call/data center 24. For example, land network 22 may include a public switched telephone network (PSTN) and/or an Internet protocol (IP) network. It is to be understood that one or more segments of the land network 22 may be implemented in the form of a standard wired network, a fiber or other optical network, a cable network, other wireless networks, such as wireless local networks (WLANs) or networks providing broadband wireless access (BWA), or any combination thereof.

As shown in FIG. 1, the call center 24 of the telematics service provider is designed to provide the vehicle hardware 26 with a number of different system back-end functions. The call center 24 depicted in FIG. 1 generally includes one or more switches 68, servers 70, databases 72, live and/or automated advisors 62, 62', processing equipment (or processor) 84, a communications module 86, as well as a variety of other telecommunication and computer equipment 74 that is known to those skilled in the art. These various telematics service provider components are coupled to one another via a network connection or bus 76, such as one similar to the vehicle bus 34 previously described in connection with the vehicle hardware 26.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices such as the server 70 and database 72.

In an example, the switch 68 may be configured to route an incoming signal to an available live advisor 62, who may be a call center operator or an advisor of a particular call center department who is available to take the call. In another example, the incoming signal may be routed to the automated response system 62'. It is to be understood that, as used herein, the term "advisor" may be broadly used to describe both a live advisor and the automated call response system. Further, the term "automated call response system" may be used interchangeably with the term automaton.

The processor 84, which is often used in conjunction with the computer equipment 74 (such as a plurality of advisor workstations 100 (an example of which is shown in FIG. 4)), and/or the processor of the workstation 100 is/are generally equipped with suitable software and/or programs enabling the processor 84 to accomplish a variety of call center 24 functions. For instance, the processor 84, via the computer equipment 74, executes computer program code encoded on a computer readable medium of the processor 84 for determining that i) an initial voice connection has been terminated, and ii) a data message including the method used to terminate a voice connection has not been received from the telematics unit 14 within a predefined message delivery time (e.g., within 15 seconds or some other predefined time period). Upon making this determination, the processor 84, via suitable computer readable code, sends a command to a communications module 86 at the call center 24 (which is described in further detail below) to attempt to establish a connection (such as a data connection) with the telematics unit 14. If a connection cannot be made, the processor 84 may execute other computer readable code for determining that the method used to terminate the initial voice connection may be due to an accidental disconnect as a result of an internal issue pertaining to the telematics unit 14, an issue pertaining to the cellular network provider 90, an issue pertaining to the call center 24, etc.

Further, the various operations of the call center 24 are carried out by one or more computers (e.g., the computer equipment 74) programmed to carry out some of the tasks of the call center 24. The computer equipment 74 (including computers) may include a network of servers (including server 70) coupled to both locally stored and remote databases (e.g., database 72) of any information processed.

In an example, the communications module 86 is a telephony system that includes suitable communications equipment that enables the call center 24 to establish a voice or data connection with another entity, such as, e.g., the telematics unit 14 in the vehicle 12, or vice versa. Such equipment may, for instance, be capable of handling voice calls, packet data sessions, or other messaging-based communications between the call center 24 and the telematics unit 14 (e.g., via a circuit-switch network), messaging (e.g., via VehComm), modems, TCP/IP supporting equipment, and/or the like. In an example, the communications module 86 may be used, e.g., by an advisor 62, 62' at the call center 24, to establish a data connection with the telematics unit 14 in response to not receiving the data message from the telematics unit 14 within a predefined message delivery time.

It is to be appreciated that the call center 24 may be any central or remote facility, manned or unmanned, mobile or fixed, to or from which it is desirable to exchange voice and data communications. As such, the live advisor 62 may be physically present at the call center 24 or may be located remote from the call center 24 while communicating therethrough.

The communications network provider 90 generally owns and/or operates the carrier/communication system 16. The communications network provider 90 includes a mobile network operator that monitors and maintains the operation of the communications network 90. The network operator directs and routes calls, and troubleshoots hardware (cables, routers, network switches, hubs, network adaptors), software, and transmission problems. It is to be understood that, although the communications network provider 90 may have back-end equipment, employees, etc. located at the telematics service provider service center 24, the telematics service provider is a separate and distinct entity from the network provider 90. In an example, the equipment, employees, etc. of the communications network provider 90 are located remote from the service center 24. The communications network provider 90 provides the user with telephone and/or Internet services, while the telematics service provider provides a variety of telematics-related services (such as, for example, those discussed hereinabove). It is to be understood that the communications network provider 90 may interact with the service or call center 24 to provide services (such as emergency services) to the user.

While not shown in FIG. 1, it is to be understood that in some instances, the telematics service provider operates a data center, which receives voice or data calls, analyzes the request associated with the voice or data call, and transfers the call to an application specific call center associated with the telematics service provider. It is to be understood that the application specific call center may include all of the components of the data center, but is a dedicated facility for addressing specific requests, needs, etc. Examples of application specific call centers include, but are not limited to, emergency services call centers, navigation route call centers, in-vehicle function call centers, or the like.

Furthermore, the call center 24 components shown in FIG. 1 may also be virtualized and configured in a cloud computer, that is, an Internet-based computing environment. For example, the computer equipment 74 may be accessed as a cloud platform service, or PaaS (Platform as a Service), utilizing cloud infrastructure rather than hosting computer equipment 74 at the call center 24. It is to be understood, however, that the call center advisor 62 may use individual stationary computer workstations (e.g., desktop computers) or mobile computer workstations (e.g., laptop computers, netbooks, tablet computers, etc.) that is operatively connected to a processor having Internet access that can access the cloud's functionality and/or services. Further, the database 72 and/or server 70 may also be virtualized as a cloud resource. The cloud infrastructure, known as IaaS (Infrastructure as a Service) typically utilizes a platform virtualization environment as a service, which may include components such as the processor 84, database 72, server 70, and computer equipment 74. In an example, application software and services (such as, e.g., navigation route generation and subsequent delivery to the vehicle 12) may be performed in the cloud via the SaaS (Software as a Service). Subscribers, in this fashion, may access software applications remotely via the cloud. Further, subscriber service requests may be acted upon by the automated advisor 62', which may be configured as a service present in the cloud.

Examples of the terminated call alert process will now be described hereinbelow in conjunction with FIGS. 2, 3A, 3B, and 4. It is to be understood that the terminated call alert process may be applied when a voice connection established between the subscriber vehicle 12 and the call center 24 has been terminated. Thus, prior to initiating the process, a voice connection is established between the vehicle 12 and the call center 24.

In an example, a voice connection may originally be initiated by the subscriber vehicle 12 using the in-vehicle telematics unit 14. For instance, a vehicle operator, passenger, or other person inside the subscriber vehicle 12 may physically initiate the voice call by activating a calling function associated with the telematics unit 14 (e.g., via a button press, a touch screen, or the like). The voice call may otherwise be initiated by verbally reciting an utterance, e.g., into the microphone 28 associated with the telematics unit 14, recognized by the telematics unit 13 as a command to initiate a voice call. The voice call initiated by the vehicle 12 may be, e.g., to request a particular telematics service, to subscribe to an additional service, to cancel a subscription, and/or the like. When the calling function is activated, the telematics unit 14 sends a signal to the call center 24, where this signal is carried over the carrier/communication system 16.

In this example, a voice connection is established between the call center 24 and the telematics unit 14 of the subscriber vehicle 12 when the signal sent by the telematics unit 14 is received by the call center 24, and a call center advisor 62, 62' activates a connection function associated with communications module 86. For instance, upon receiving the signal (which may be referred to hereinbelow as the voice call), the switch 68 at the call center 24 routes the voice call to an available advisor 62, 62', who/which initially services the voice call. Depending, at least in part, on the purpose for which the call was made by the subscriber vehicle 12, the advisor 62, 62' initially servicing the call may be able to fully service the call. If so, this initial advisor 62, 62' addresses all of the subscriber's (in this case, the caller's) requests and/or concerns. In some cases, the advisor 62, 62' initially servicing the call may transfer the call to another advisor at another department of the call center 24 (or to a specific call center if the advisor 62, 62' initially servicing the call is present at a data center). Upon receiving the transferred call, the advisor at the other department (or at the other call center) services the call or may, in some instances, transfer the call to yet another department (or call center) if necessary. It is to be understood that the voice call may be transferred to as many call center departments (or call centers) as necessary in order to properly service the call.

In another example, the voice connection may be initiated by an advisor 62, 62' at the call center 24, and this voice connection may be directed to a particular subscriber (such as to the subscriber vehicle 12). This connection may have been initiated, for example, for a variety of reasons, such as to offer a new service to the subscriber, to address an issue pertaining to the subscriber's account, etc. In some instances, the connection may be initiated by the live advisor 62 utilizing the communications module 86 by activating a calling command on his/her workstation 100 (shown in FIG. 4). The connection may otherwise be initiated by an automaton 62' by sending a signal to the communications module 86 to initiate a voice call to the subscriber vehicle 12. The voice call is received by the telematics unit 14 inside the vehicle 12, and any of a vehicle operator, passenger, or other person inside the vehicle 12 may pick up the call. This may be accomplished, for instance, by activating a connect or answer function associated with the telematics unit 14 (e.g., via a button press, touch screen, or the like), reciting a verbal command into the microphone 28 to activate a connect function, or the like. The voice connection is established between the call center 24 and the telematics unit 14 when the voice call is picked up by one of the occupants of the subscriber vehicle 12.

It is to be understood that the voice connection established between the call center 24 and the vehicle 12 (regardless of who/what initiated the call) remains open until the call is terminated. As used herein, an "open voice connection", a voice connection that "remains open", or the like refers to a voice connection that includes at least two parties who are connected, e.g., through the carrier/communication system 16. A voice connection or call is considered to be "terminated" when one or more of the parties of the voice call disconnect(s), or is/are disconnected from the previously-established voice connection. When this occurs, the party that is left on the line will eventually be given (e.g., within a few seconds or more) a network treatment signal (e.g., a busy signal). In instances where the call is dropped due to a network error, then both parties may receive the network treatment signal. It is to be understood that when a voice connection is terminated, either one or no parties are left on the line.

A voice connection may be terminated intentionally (referred to herein as a purposeful disconnection) or accidentally (referred to herein as an accidental disconnection). As used herein, a "purposeful disconnection", "intentional disconnection", or the like is the disconnection of a voice connection as a result of one of the party's conscious decision to do so. A "party," as used herein, refers to a person (e.g., the subscriber) or entity (e.g., the call center advisor 62, 62') who/that is a participant in the voice connection. In an example, a purposeful disconnection may be accomplished by the subscriber by consciously electing to terminate the voice connection. The subscriber may do so, e.g., by choosing to activate, and then actually activating a disconnect function associated with the telematics unit 14. Generally, an early termination of the voice connection occurs when the voice connection is terminated before the call has been completely serviced by the call center advisor 62, 62'.

As used herein, a "completely serviced call" is one where the purpose for which the voice call was made has been fully addressed and/or fulfilled during the voice connection. Typically, the completely serviced voice call is terminated when there is a mutual understanding between the parties/participants of the voice call that the connection is going to imminently end. This mutual understanding may be established via a number of ways, such as, e.g., when one or more of the parties verbally recite an utterance during the voice call that would lead one or more of the parties/participants to believe that the voice call is going to end. Examples of such utterances may include "Thank you for calling", "Goodbye", "Have a nice day", or the like. In contrast, early termination of the call may occur when the call has not been completely serviced, and there is no mutual understanding between the parties/participants that the voice call is going to imminently end.

A purposeful disconnection of the voice connection may occur for any reason, and is typically accomplished as a physical act that was consciously performed by the party who is terminating the call early. In one example, the purposeful disconnection may be accomplished by the subscriber, for example, by choosing to terminate the call early, and does so by pressing a voice call disconnect button, icon (e.g., via a touch screen), or the like associated with the telematics unit 14 inside the vehicle 12. In another example, the purposeful disconnection may be accomplished by the advisor 62, 62', such as when the audio portion of the voice call is lost or cannot be deciphered by the advisor 62, 62'. The advisor 62, 62' may, in these instances, purposefully disconnect the call by selecting (via, e.g., a mouse click or touch screen) a disconnect function key on the advisor's 62 workstation 100, or by transmitting a disconnect signal from the advisor 62' to the network provider to ultimately disconnect the call.

In some cases, it may be possible for a vehicle 12 occupant to accidently terminate a voice call by accidently activating the disconnect function associated with the telematics unit 14. This may be accomplished, for instance, by a vehicle passenger inadvertently activating the disconnect button during the voice call (e.g., by accidently leaning against, and activating the disconnect button). Another way of accidently terminating the voice call may include accidently pressing the disconnect button instead of another button associated with the telematics unit 14 (e.g., if the vehicle occupant cannot visually decipher the icons or labels associated with the buttons 32 of the telematics unit 14). It is to be understood, however, that the software program run by the processor 36 cannot determine what the conscious thoughts of the vehicle occupant are upon activating the disconnect button. Under these circumstances, the method for terminating the voice connection may still be classified as a purposeful disconnection.

As used herein, an "accidental disconnection" refers to the disconnection of the voice connection as a result of an unintentional and/or unexpected happening that does not involve functions associated with the telematics unit 14 that are activatable by a vehicle occupant. An accidental disconnection may occur, for instance, as a result of a failure of the carrier/communications system 16 that was used to establish the initial voice connection. Some examples of failures of the carrier/communication system 16 may include a down cellular tower, a weather interference with a cellular signal or circuit, an overwhelmed circuit due to an overload of cellular traffic, a dropped call as a result of a handoff between cellular towers, a loss in a radio frequency (RF) signal strength, and/or the like.

Accidental disconnections may also occur as a result of an unexpected dropped connection by the telematics unit 14, and the dropped connection is not a direct consequence of an act performed by a vehicle occupant. For instance, the accidental disconnection does not involve the activation of a disconnect function associated with the telematics unit 14 by a vehicle occupant. An unexpected dropped connection by the telematics unit 14 may occur as a result of, for example, a program error of the processor 36 that causes the network access device (NAD) (which is a portion of the telematics unit 14 containing the cellular chipset 40 and associated communications software and functionality) to reset and drop the call. In this example, when the NAD re-acquires power and/or service, the telematics unit 14 will direct the NAD to initiate a packet data session to the call center 24 with a message including the reason for the termination of the initial voice connection. Details of the message will be provided below. An accidental disconnection by the telematics unit 14 may otherwise include a malfunction of the telematics unit 14, such as, e.g., a faulty wire or component of the unit 14.

An accidental disconnection may also occur because of an inadvertent occurrence at the call center 24. For instance, the call center 24 may experience a power outage that may adversely affect calling traffic into and out of the center 24. In another example, the communications module 86 utilized by the call center 24 during the voice connection with the subscriber vehicle 12 may experience a malfunction that may also adversely affect the voice connection.

Figure 2:
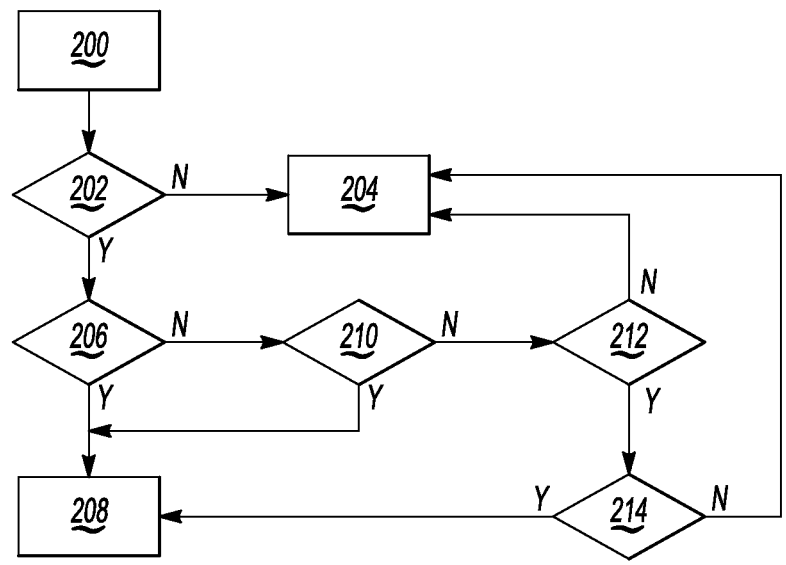
FIG. 2 is a logic flow diagram depicting examples of a terminated call alert process.

Examples of the terminated call alert process may be used to enable a call center advisor 62, 62' to determine if a call back should be initiated to a subscriber vehicle 12 party of an unexpected terminated voice call, and these examples will now be described at least in conjunction with FIG. 2. It is to be understood that the examples of the process are initiated upon detecting that a voice connection initially established between the telematics unit 14 and a facility (such as the call center 24) has been terminated. This is shown at step 200 in FIG. 2. In an example, termination of the call may be detected by the processor 36 of the telematics unit 14 upon realizing that the cellular chipset 40 no longer has a connection established between the telematics unit and another device (such as a telephony device associated with the communications module 86 at the call center 24).

As soon as the termination of the voice connection has been detected, in an example, the processor 36 initiates a software program (which includes computer readable code encoded on a computer readable medium) to identify the method that was used to terminate the connection. The determination of the method used to terminate the connection will be described below in conjunction with steps 202, 206, 210, 212, and 214 of FIG. 2. It is to be understood that the method used to terminate the call will be used, by the advisor 62, 62' at the call center 24, to determine whether or not to initiate a call back to the vehicle 12. If the advisor 62, 62' decides not to initiate a call back, the process ends. However, if the advisor 62, 62' decides to initiate a call back, the process includes transmitting a data message to the call center 24 at step 208. This data message includes information pertaining to the method used to terminate the connection, and will be described in further detail below.

It is to be understood that the processor 36, via the software program(s), can detect when the voice connection is terminated purposefully (e.g., by activating a disconnection function associated with the telematics unit 14) or accidentally (e.g., because of an issue pertaining to the telematics unit 14). It is to be understood, however, that detection of network dropped calls cannot be detected by the processor 36 without enabling the FID software, described briefly above in conjunction with FIG. 1. Again, the FID software is specifically designed to detect network dropped calls, and the software may be enabled, for instance, by the call center 24 upon activation of the user's subscription and/or by a user request. As shown at step 202 in FIG. 2, the terminated alert call process cannot be completed when the FID software is not enabled. In this instance, no alert (e.g., in the form of a data message) can be sent to the call center advisor 62, 62' (as shown by step 204).

In instances where the FID software is enabled, the process moves to step 206 where the processor 36, via the software program, determines whether or not the unexpected termination of the voice connection was because of a network dropped call. The network dropped call may, e.g., be the result of a failure of the carrier/communication system 16, such as a down cellular tower, and overwhelmed circuit, etc. In an example, the FID software automatically detects when a voice connection is terminated because of a network dropped call, and the processor 36, which includes the FID software, utilizes this information in the software program to render a determination that the voice connection was terminated because of an accidental disconnection. In this case, the processor 36 automatically generates a data message at step 208. Again, details of the generation of the data message, and its transmission to the call center 24 will be described in further detail below.

In instances where the FID software does not detect that the call was terminated because of a network dropped call at step 206, the process moves from step 206 to step 210 where the processor 36 (via the software program) determines if the voice connection was unexpectedly terminated by the telematics unit 14. The termination of the connection by the telematics unit 14 may, for instance, be caused by an internal issue pertaining to the telematics unit 14, which the processor 36 would classify as an accidental disconnection. In an example, the processor 36 may determine that the call was accidentally terminated by the telematics unit 14 if the processor 36 did not receive a signal from any of the features associated with the disconnect function of the telematics unit 14 (e.g., upon activating a disconnect button 32, touching an icon selected on the touch screen of the display 80, etc.). The processor 36 may determine that the call was accidentally terminated by the telematics unit 14, e.g., when a call is dropped due to an NAD reset and/or a random or unexpected software bug. In this example, the processor 36 will determine that the voice connection was terminated accidently (i.e., due to an issue pertaining to the telematics unit 14), and the process moves to step 208 to generate a data message for transmission to the call center 24.

In instances where the processor 36 determines that the connection was terminated accidently due to an internal issue with the telematics unit 14, the processor 36 may, in some instances, initiate a diagnostics check on the telematics unit 14 to determine if the telematics unit 14 is working properly. If the results of the diagnostics check indicate that the telematics unit 14 is not working properly, the processor 36 may include this information (e.g., as an error code) in the data message to be transmitted to the call center 24, which will be described further below.

Referring back to step 210, if the processor 36 receives a signal indicating that the disconnect function associated with the telematics unit 14 was activated; the processor 36 will then make a determination if the voice connection was terminated purposefully at step 212. The determination that the termination of the call was made purposefully may be accomplished upon receiving a signal from any features associated with the disconnection function of the telematics unit 14 indicating that the disconnection function has been activated. If the processor 36 does not receive this signal, the process ends at step 204 and no data message is generated by the processor. If a signal is received by the processor 36, the process moves to step 214 where the processor 36 determines if a feature identification (FID) is enabled for voice calls that are purposefully disconnected. The FID is a software program that may be configured by the call center 24, and is used to enable the examples of the method described herein. The FID is responsible for instructing the telematics unit 14 to transmit a message to the call center 24 in response to a terminated voice connection. It is to be understood that if the FID is not enabled, the process ends at step 204. However, if the FID is enabled, the process moves to step 208 where a data message may be generated and transmitted to the call center 24.

Figure 3A:
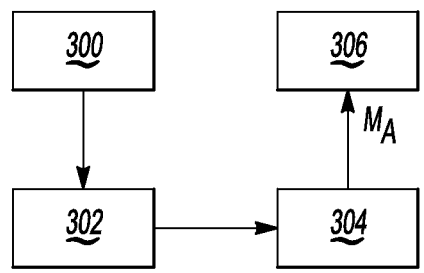
FIG. 3A is a flow diagram depicting one example of a terminated call alert process when termination is accomplished via a purposeful disconnect by a user.

Specific examples of the terminated call alert process for when the voice connection is terminated purposefully will now be described herein. With reference to FIG. 3A, when the disconnect function of the telematics unit 14 is activated (e.g., by pressing the disconnect button 32) at step 300, a signal is transmitted from hardware utilized to activate the disconnect function (e.g., the button 32) to the cellular chipset 40 of the telematics unit 14 at step 302. This signal indicates, to the telematics unit 14, that the user desires to disconnect the existing voice connection. Before the connection is actually terminated, and upon receiving the signal, at step 304, the telematics unit 14 automatically generates and transmits a message (e.g., an SMS message) to the call center 24 at step 306. This message indicates, in some form, that the voice connection was terminated purposefully. It is to be understood that the telematics unit 14 will give up any control of the vehicle audio component 60 upon receiving the signal to disconnect the voice connection. Thus, to the user, the call may appear to have been, but is not actually disconnected yet. In this case, the audio component 60 will return to its previous state before the voice connection was established (e.g., if the user was listening to a radio station before the voice connection was established, the audio component will resume playing that same radio station even before the call is actually terminated) Immediately after transmission of the message, the telematics unit 14 is automatically disconnected from the communication channel used to establish the now dropped/terminated voice connection. It is further to be understood that the actual disconnection of the telematics unit 14 from the communication channel will not be discernible to the user at the time of the disconnection.

Figure 3B:
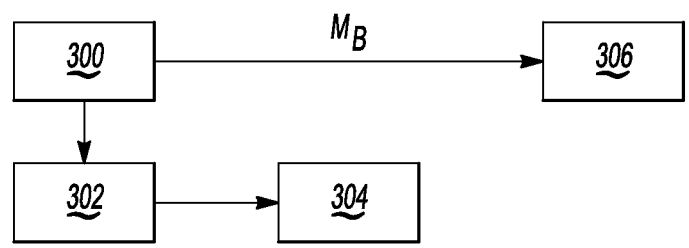
FIG. 3B is a flow diagram depicting another example of a terminated call alert process when termination is accomplished via a purposeful disconnect by a user.

In the example shown in FIG. 3B, when the disconnect function of the telematics unit 14 is activated at step 300, a packet data message is automatically transmitted from the telematics unit 14 to the call center 24 at step 306. At substantially the same time, a signal is automatically transmitted from the hardware utilized to activate the disconnect function (e.g., the button 32) to the cellular chipset 40 of the telematics unit 14 at step 302. Again, this signal indicates that a communication channel for the voice connection is no longer established. Then, at step 304, the telematics unit 14 is automatically disconnected from the communication channel.

Referring back to FIG. 2, in an example, the data message generated at step 208 may be a human-readable, text-based message that is transmittable from the telematics unit 14 to the call center 24 in the form of a short message service (SMS) message or a packet data message during a packet data session established between the telematics unit 14 and the call center 24. The human-readable message may contain the actual method used to terminate the call (e.g., that a disconnect function was activated) and/or a classification of the method used to terminate the voice connection (e.g., a purposeful disconnection). In an example, if the information received indicates that a disconnect function of the telematics unit 14 was activated, then the processor 36 will classify the method used to terminate the call as a purposeful disconnection, and at least this classification will be contained in the data message generated by the processor 36. If, on the other hand, the information obtained indicates that a disconnection function was not activated when the connection was terminated, then the processor 36 classifies the method used to terminate the call as an accidental disconnection, and at least this classification will be contained in the data message generated by the processor.

The human-readable message generated by the processor 36 may state something similar to "disconnect function activated", "intentional disconnection", or the like in instances where the processor 36 determines that the call was terminated purposefully on behalf of a vehicle occupant. The human-readable message may otherwise state something similar to "disconnect function not activated", "accidental disconnection", or the like in instances where the processor 36 determines that the call was accidently disconnected. The human-readable message may be viewable by a live advisor 62 at the call center 24, e.g., upon displaying the message on the advisor's workstation 100, which will be described further hereinbelow in conjunction with FIG. 4.

In another example, the data message may be a computer-readable message that contains computer readable code and/or binary code that an automaton 62' can read to be apprised of the method that was used to terminate the voice connection as determined by the processor 36 associated with the telematics unit 14. In an example, this message may be packetized and transmitted from the telematics unit 14 during a packet data session with the call center 24.

In some instances, the data message may also include additional information pertaining to the method used to terminate the connection, such as the time that the call was terminated (obtained, e.g., from the RTC 46), the location of the vehicle 12 at the time the call was terminated (obtained, e.g., from the GPS unit 48), information regarding a then-current status of the telematics unit 14 in terms of operability (obtained, e.g., from the processor 36), and/or the like.

The data message (e.g., $M_A$ and $M_B$ shown in FIGS. 3A and 3B, respectively) is transmitted from the telematics unit 14 disposed in the vehicle 12 to the call center 24. In one example, the message $M_A$, $M_B$ (if in human-readable form) is displayed on a display screen 102 of the workstation 100 of a live advisor 62. This is shown in FIG. 4. In another example, the message $M_A$, $M_B$ (if in computer-readable form) may either i) be converted into human-readable form via a software program run by the processor 84 at the call center 24 and then displayed on the display screen 102 of the workstation 100.

In the example shown in FIG. 4, the data message $M_A$, $M_B$ is received by the call center 24 and displayed on a display screen 102 of a workstation 100 of the live advisor 62 who was servicing the voice call when the call was unexpectedly terminated. The advisor workstation 100 is operatively connected to a processor, such as the call center processor 84 (where all of the respective workstations of the live advisors 62 at the call center 24 are operatively connected). The advisor workstation 100 may otherwise contain its own processor. In the latter instance, the workstation 100 is an individual computing station that may be stationary (e.g., desktop computers) or mobile (e.g., laptop computers, netbooks, etc.). In an example, the processor connected to the workstation (e.g., the processor 84) runs a software program or application that displays the message $M_A$, $M_B$ on the display screen 102 of the advisor's workstation 100.

In another example, the data message $M_A$, $M_B$ may be transmitted in another format, such as in binary code or other computer readable code. In this example, the processor connected to the workstation 100 (e.g., the processor 84) converts the content of the data message DM into a human-readable form, and displays this human-readable message on the display screen 102 of the advisor's workstation 100.

Upon viewing the data message $M_A$, $M_B$, in one example, the live advisor 62 determines whether or not a call back to the subscriber vehicle 12 should be initiated. This determination is based, at least in part, on the information included in the data message $M_A$, $M_B$ that is then-currently displayed on the advisor's workstation 100. In instances where the data message $M_A$, $M_B$ contains the classification itself, then the advisor 62 utilizes the classification information directly to determine if a call back would be appropriate. In an example, if the data message $M_A$, $M_B$ reveals that the initial voice call was terminated accidentally, the advisor 62 may determine (in view, at least in part, of policies/regulations established at the call center 24) that a call back would be appropriate. Upon coming to this determination, the live advisor 62 may initiate the call back to the subscriber vehicle 12 utilizing the communications module 86 to establish a connection. If the call back is answered by the telematics unit 14 (e.g., upon pressing a connect button associated with the telematics unit, etc.), a new voice connection (identified by V.C. in FIG. 4) between the call center 24 and the vehicle 12 is established so that the advisor 62 can finish servicing the initial voice call.

In instances where the initial voice connection was purposefully disconnected by the vehicle 12, the live advisor 62 may determine, based at least on the contents of the initial voice call, whether or not a call back would be appropriate. For example, the live advisor 62 may come to the conclusion, prior to the termination of the initial voice connection, that the subscriber does not want further servicing of the call. In this case, the advisor 62 may make the determination that a call back would be inappropriate. In another example, the subscriber may have indicated upon setting up his/her account that he/she always wants a call back in the event that a voice call is unexpectedly terminated. In this case, the advisor 62 may refer to a user profile stored in the database 72 at the call center 24 that includes the subscriber's account information, and initiate a call back in order to establish a new voice connection VC with the vehicle 12 based on the information.

In instances where the data message $M_A$, $M_B$ transmitted to the call center 24 from the telematics unit is in the form of binary code or other computer readable code may, e.g., be viewed by an automaton 62' at the call center 24. Upon viewing the data message $M_A$, $M_B$, the automaton 62' may be pre-programmed not to initiate a call back upon receiving a data message $M_A$, $M_B$ that indicates that the call was purposefully terminated by the subscriber vehicle 12. In another example, the automaton 62' may refer to the user profile to determine if a call back is desired, and if so will override its default setting and initiate a call back.

In some instances, the data message $M_A$, $M_B$ sent in human-readable form may be converted (via, e.g., a program run by the processor 84 to which the automaton 62' is connected) into computer readable form so that the message is viewable by an automaton 62'.

In an example, upon recognizing by the advisor 62, 62' that the initial voice connection was terminated, the processor 84 to which the advisor workstation 100 or the automaton 62'may be set into a message-waiting mode where the advisor 62, 62' waits for the data message $M_A$, $M_B$ transmitted from the telematics unit 14. The message-waiting mode may be set to a predefined amount of time, such as a pre-established message delivery time for SMS messages, MMS messages, etc. In an example, the message delivery time may be set to 15 seconds for SMS messages. If the processor 84 determines that a message $M_A$, $M_B$ is not received by the advisor 62, 62' within the message delivery time, the processor 84 may send a command signal to the communications module 86 to attempt to establish a connection with the telematics unit 14. This is accomplished to determine whether or not there is a technical issue with the telematics unit 14. For instance, if the attempt to establish a connection with the telematics unit 14 fails, the processor 84 will determine that the method used to terminate the call was due to an internal issue pertaining to the telematics unit 14 or with the wireless network used to make the connection attempt. The processor 84 will thus classify the termination method as an accidental disconnection.

In some cases, the telematics unit 14 may be equipped with a function key or button that, when activated, enables a vehicle user to activate or deactivate a data message transmission function of the telematics unit 14. When enabled, the telematics unit 14 may be configured to automatically transmit a data message to the call center 24 each time a voice connection with the call center 24 is terminated. However, when the function is disabled, no data message is sent to the call center 24. In this case, the advisor 62, 62' will not be apprised of the method used to terminate the call for use in the advisor's 62, 62' determination of whether or not to initiate a call back.

While several examples have been described in detail, it will be apparent to those skilled in the art that the disclosed examples may be modified. Therefore, the foregoing description is to be considered non-limiting.

The invention claimed is:

1. A terminated call alert process, comprising:
detecting, via a cellular chipset associated with a vehicle-dedicated communications device disposed inside a vehicle, that a voice connection initially established between the vehicle-dedicated communications device and a facility has been terminated;
identifying a method used to terminate the initial voice connection via a processor operatively associated with the vehicle-dedicated communications device, the processor executing computer program code encoded on a computer readable medium, wherein:
the method used to terminate the initial voice connection includes a purposeful disconnect initiated by the user of the vehicle-dedicated communications device; and
the terminating of the initial voice connection via the purposeful disconnect is accomplished by activating a disconnect function operatively associated with the vehicle-dedicated communications device;
transmitting a signal from hardware utilized to activate the disconnect function to a cellular chipset operatively connected to the vehicle-dedicated communications device, the signal indicating that a communication channel for the initial voice communication is no longer established;
automatically disconnecting the telematics unit from the communication channel; and
automatically transmitting an SMS message from the vehicle-dedicated communications device to the facility upon disconnecting the vehicle-dedicated communications device from the communication channel, the SMS message indicating that the initial voice connection was terminated purposefully.

2. The terminated call alert process as defined in claim 1, further comprising displaying the information included in the SMS message on an advisor workstation at the facility.

3. A terminated call alert process, comprising:
detecting, via a cellular chipset associated with a vehicle-dedicated communications device disposed inside a vehicle, that a voice connection initially established between the vehicle-dedicated communications device and a facility has been terminated;
identifying a method used to terminate the initial voice connection via a processor operatively associated with the vehicle-dedicated communications device, the processor executing computer program code encoded on a computer readable medium, wherein:
- the method used to terminate the initial voice connection includes a purposeful disconnect initiated by the user of the vehicle-dedicated communications device; and
- the terminating of the initial voice connection via the purposeful disconnect is accomplished by activating a disconnect function operatively associated with the vehicle-dedicated communications device;
- automatically transmitting a packet data message from the vehicle-dedicated communications device to the facility, the packet data message indicating that the initial voice connection was terminated purposefully;
- automatically transmitting a signal from hardware utilized to activate the disconnect function to a cellular chipset operatively connected to the vehicle-dedicated communications device, the signal indicating that a communication channel for the initial voice communication is no longer established; and
- automatically disconnecting the vehicle-dedicated communications device from the communication channel.

4. The terminated call alert process as defined in claim 3, further comprising displaying the information included in the packet data message on an advisor workstation at the facility.

5. A terminated call alert system, comprising:
- a vehicle-dedicated communications device disposed inside a vehicle;
- a facility including a communications module for establishing an initial voice connection with the vehicle-dedicated communications device;
- a processor operatively associated with the vehicle-dedicated communications device, the processor executing computer program code encoded on a computer readable medium for:
  - detecting that the initial voice connection established between the vehicle-dedicated communications device and the facility has been terminated; and
  - identifying a method used to terminate the initial voice connection, wherein the method used to terminate the initial voice connection includes a purposeful disconnect initiated by the user of the vehicle-dedicated communications device;
- a disconnect function operatively associated with the vehicle-dedicated communications device, the disconnect function to be used to activate the purposeful disconnect;
- a signal to be automatically transmitted from hardware utilized to activate the disconnect function to a cellular chipset operatively connected to the vehicle-dedicated communications device, the signal indicating that a communication channel for the initial voice connection is no longer established;
- an SMS message to be automatically transmitted from the vehicle-dedicated communications device to the facility upon disconnecting the vehicle-dedicated communications device from the communication channel, the SMS message indicating that the initial voice connection was terminated purposefully; and
- means for automatically disconnecting the vehicle-dedicated communications device from the communication channel.

6. The system as defined in claim 5, further comprising an advisor workstation at the facility, the advisor workstation including a display screen upon which the SMS message transmitted from the vehicle-dedicated communications device to the facility is displayed.

7. A terminated call alert system, comprising:
- a vehicle-dedicated communications device disposed inside a vehicle;
- a facility including a communications module for establishing an initial voice connection with the vehicle-dedicated communications device;
- a processor operatively associated with the vehicle-dedicated communications device, the processor executing computer program code encoded on a computer readable medium for:
  - detecting that the initial voice connection established between the vehicle-dedicated communications device and the facility has been terminated; and
  - identifying a method used to terminate the initial voice connection, wherein the method used to terminate the initial voice connection includes a purposeful disconnect initiated by the user of the vehicle-dedicated communications device;
- a disconnect function operatively associated with the vehicle-dedicated communications device, the disconnect function to be used to activate the purposeful disconnect;
- a packet data message to be automatically transmitted from the vehicle-dedicated communications device to the facility, the packet data message indicating that the initial voice connection was terminated purposefully;
- a signal to be automatically transmitted from hardware utilized to activate the disconnect function to a cellular chipset operatively connected to the vehicle-dedicated communications device, the signal indicating that a communication channel for the initial voice communication is no longer established; and
- means for automatically disconnecting the vehicle-dedicated communications device from the communication channel.

8. The system as defined in claim 7, further comprising an advisor workstation at the facility, the advisor workstation including a display screen upon which the packet data message transmitted from the vehicle-dedicated communications device to the facility is displayed.

* * * * *